Nov. 2, 1926.

J. G. SCHMITT 1,605,618

ACCELERATOR ATTACHMENT

Filed May 14, 1925

INVENTOR
JOHN G. SCHMITT.
ATTORNEY

Nov. 2, 1926.

J. G. SCHMITT 1,605,618

ACCELERATOR ATTACHMENT

Filed May 14, 1925 2 Sheets-Sheet 2

INVENTOR
JOHN G. SCHMITT.
BY
ATTORNEY

Patented Nov. 2, 1926.

1,605,618

UNITED STATES PATENT OFFICE.

JOHN G. SCHMITT, OF BROOKLYN, NEW YORK.

ACCELERATOR ATTACHMENT.

Application filed May 14, 1925. Serial No. 30,184.

My invention relates to accelerator attachments for automotive vehicles and is concerned more particularly with an accelerator pedal accessory.

An object of the invention is to so organize and interrelate the attachment parts as to admit of the ordinary operation of the accelerator pedal thru a lateral or crosswise, as distinguished from an up and down, movement of the foot.

A further object of the invention is to provide in connection with the moving parts of the accelerator attachment, a rigidly supported foot rest, said foot rest being adjustable, both angularly and vertically, with respect to the floor board of the vehicle upon which the attachment is installed.

A still further object of the invention is to so form the attachment as to admit of its use on or in connection with any and all types of automotive vehicles having a foot accelerator pedal as an item of its standard equipment.

A still further object of the invention is to provide an operating lever having means associated with it for transmitting and converting lateral or sidewise motion into vertical motion; the lateral or sidewise motion being effected by a corresponding movement of the foot, whereas the vertical movement conveyed to a secondary lever, acts directly upon the accelerator pedal to depress it.

Other objects of the invention, such as the provision of means for eliminating friction between certain of the moving parts; the provision of an abutment at one side of the foot rest against which the foot is adapted to bear; etc., will be hereinafter more fully explained.

In the drawings, wherein like reference characters denote like or corresponding parts.

Fig. 4 is a longitudinal vertical sectional view;

Fig. 5 is a detail perspective view of the operating lever and its associated cam;

Fig. 8 is a detail view of a modified form of cam.

Figure 1:
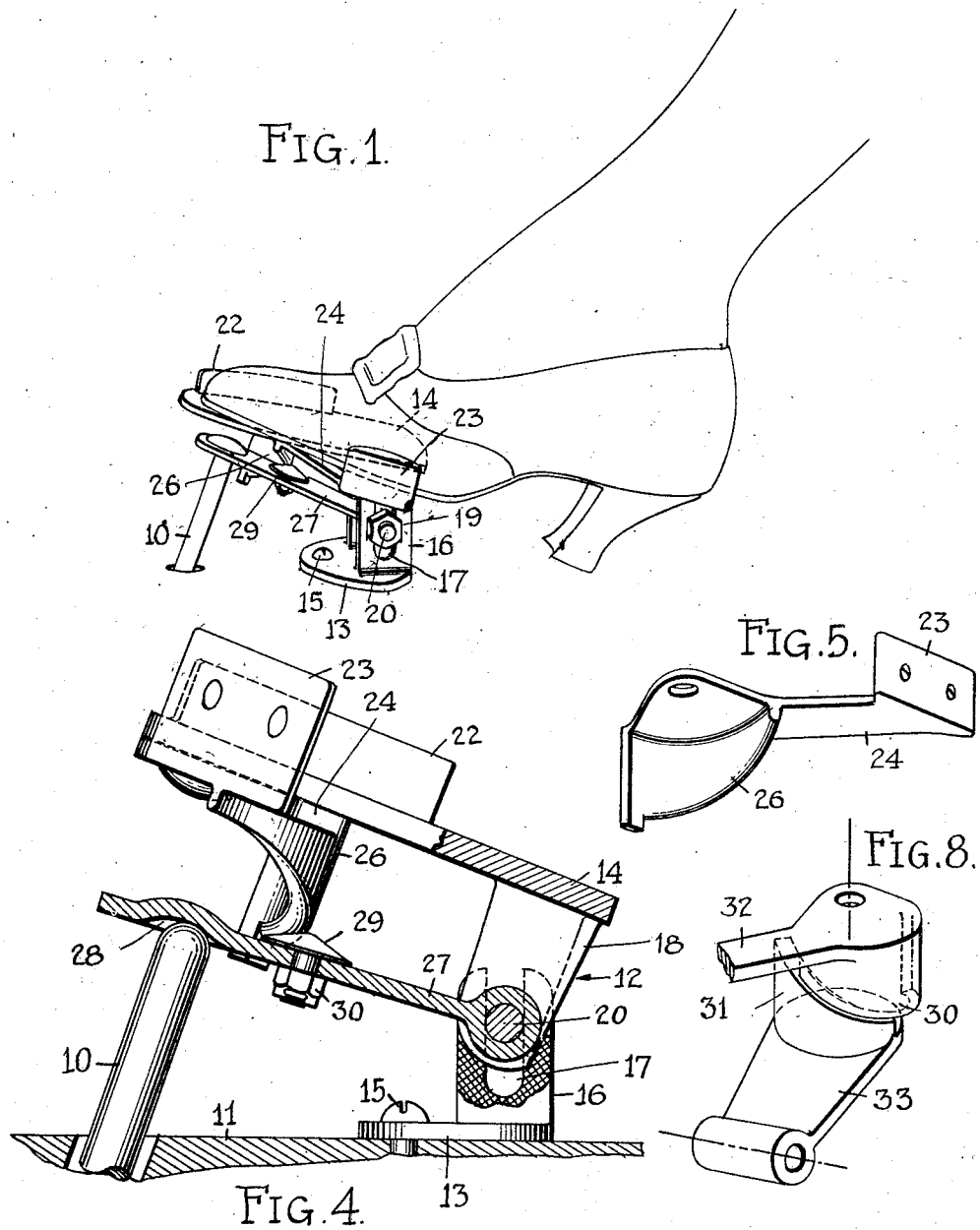
Fig. 1 is a perspective view of the accelerator attachment showing its relation to the accelerator pedal of an automobile.
Figure 2:
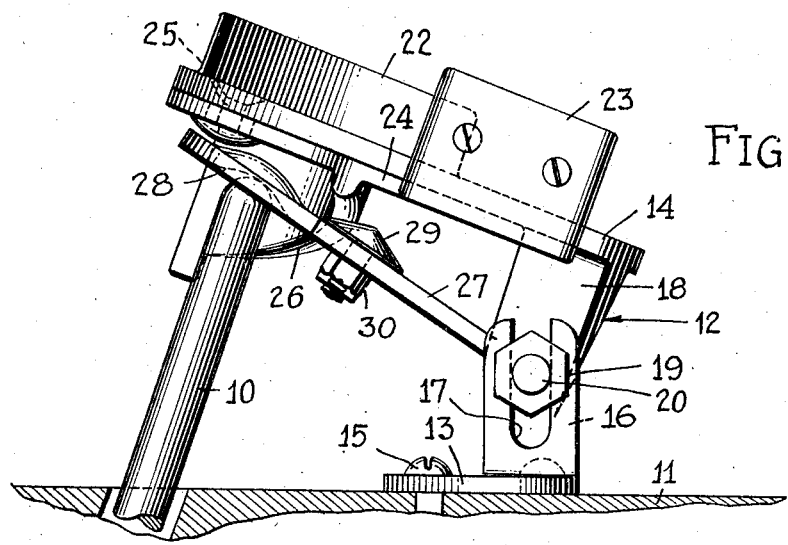
Fig. 2 is a side elevation of the attachment.
Figure 6:
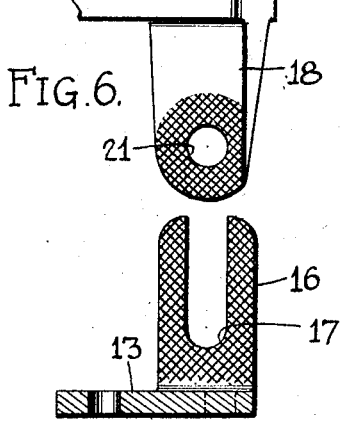
Fig. 6 is a detail side elevation, partly in section of the base plate and the foot rest detached.
Figure 7:
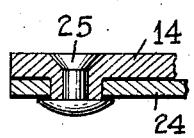
Fig. 7 is a fragmentary sectional view showing the connection between the operating lever and the foot rest.

In the embodiment of the invention selected for illustration, a push rod type accelerator pedal 10 is shown. Such pedal (see Fig. 2) extends thru and above the floor 11 of the vehicle, being generally inclined to the vertical. The accelerator attachment, designated in its entirety as 12, includes a base plate 13 and a foot rest 14. The base plate 13 is bolted or screwed as at 15 to the floor 11 of the vehicle. It is provided, adjacent to its opposite ends, with upstanding lugs 16 appropriately spaced, each lug having formed therein a vertical open end slot 17. The foot rest 14 (see Fig. 2) is adapted to be rigidly supported. On its underface it is provided with downwardly extending lugs 18 appropriately spaced, said lugs 18 being so related to the lugs 16 of the base plate as to fit therebetween as illustrated. The engaging faces of the lugs 16 and 18 (see Fig. 6) are preferably knurled, as in the preferred embodiment it is intended that said foot rest 14 may be adjusted both angularly and vertically, and held in its adjusted position by a nut 19 threaded on the end of a bolt 20 passing transversely thru the slots 17 of the lugs 16 and openings 21 formed in the lugs 18 of the foot rest. The vertical adjustment is accordingly limited by the length of the slots 17, whereas the angular adjustment may be effected throughout an arc of approximately 90°.

In fastening the bed plate 13 to the floor of the vehicle, care should be taken that the foot rest 14, when adjusted, occupies a position directly above the outer end of the accelerator pedal 10. Said foot rest 14, in the vicinity of its forward end, and throughout a considerable portion of the length of one side thereof, is provided with an upstanding abutment 22. This abutment, in practice, offers a bearing surface against which the foot rest is adapted to bear. Said abutment 22 is preferably rigid and non-adjustable.

Figure 3:
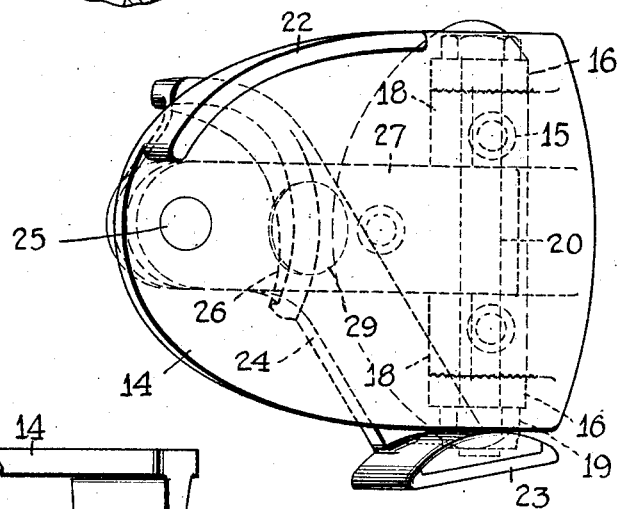
Fig. 3 is a plan view of the attachment.

On the opposite side of the foot rest 14 a movable abutment 23 is provided. This abutment 23 is preferably disposed behind or toward the rear of the abutment 22. It overhangs the edge of the foot rest 14 and is formed as an integral part of an operating lever 24. Said lever (see Fig. 3) viewed in plan, is angular. It is pivotally fastened as at 25 to the foot rest 14, and except for the upstanding portion or abutment 23 it is at all times confined to the undersurface of the foot rest. Intermediately of its ends, and on its under-surface, it (the lever 24) is provided with a cam surface 26, said surface being of arcuate form and so related to a lever 27 as to vertically move it should the lever 24 be moved. By shifting or moving the lever 24 laterally beneath the foot rest, the cam surface 26 is correspondingly moved. Said surface being at all times in engagement with the lever 27, obviously the latter lever is appropriately moved, the movement of the lever 27, however, being at right angles to the movement accorded the lever 24. Said lever 27 at its free end overhangs the accelerator pedal 10. At its opposite end it extends between the lugs 16 of the base plate where it is pivotally mounted on the bolt 20 which carried the foot rest 14. To insure positive contact between said lever 27 and the accelerator pedal 10, the former (the lever 27) is slightly depressed as indicated at 28 to receive in the depression the outer or free end of the accelerator pedal.

As a means for preventing or eliminating friction in the operation of the attachment, the lever 27 intermediately of its ends is provided with a rotary friction disc 29. Preferably such disc 29 is substantially cone shaped, its conical face operating a bearing surface against which the operating face of the cam 26 is adapted to bear. Said disc 29 is held in place by a nut 30.

In the operation of the attachment, assuming proper adjustment has first been made to suit the physical characteristics of the operator, the foot of the operator is placed firmly upon the foot rest 14 between the abutments 22 and 23 thereof. By shifting the foot laterally or crosswise the foot rest the upstanding portion or abutment 23 of the operating lever 24 is moved laterally or away from the edge of the foot rest, such movement causing the lever 24, of which it (the abutment 23 forms a part), to correspondingly move about its pivot axis 25. As the lever 24 is shifted the cam surface 26, acting directly on the lever 27 thru the anti-friction disc 29, depresses said lever 27 to an extent directly proportional to the extent of movement accorded the operating lever. And, since the lever 27 bears directly upon the accelerator pedal 10, obviously the latter is depressed as said lever 27 swings about its horizontal axis defined by the bolt 20. The return movement of the accelerator pedal, should lateral pressure on the abutment 23 be withdrawn, is brought about by means of a spring (not shown) forming a part of the standard equipment of all such accelerator devices.

In the modification of Fig. 8 a two-part cam is shown. The cam surfaces 30 and 31 of said modification are mounted respectively on the operating lever 32 and on the secondary lever 33, and since said surfaces 30 and 31 act at all times in unison, obviously, for a given movement of the operating lever 32 a greater movement is accorded the secondary lever 33 than it is possible to otherwise obtain.

An attachment characterized as above set forth may be used on or in connection with any and all types of accelerators. The abutment 22, in view of its forward location, aids materially in giving to the operator that leverage required to shift the operating lever 24. The knurled surfaces of the lugs 16 and 18 hold the foot rest in its adjusted position. Both the angular and vertical adjustment are obtained by first loosening the nut 19, next setting the foot rest 24 in the desired adjusted position, and then re-tightening the nut. Moreover, if desired, an increased radius of action of the lever 27 may be obtained by altering the position of the cam surface 26 relatively to it. The further the cam surface 26 is removed from the free end of the lever 27, the greater the throw of said lever for a given movement of said cam.

Such an attachment is especially desirable as a taxicab or other commercial vehicle accessory in view of its ease of operation, its compactness, and its apparent tendency to relieve the driver or operator of that tension required to control the accelerator pedal where its control is dependent upon a downward pressure with the foot.

It also has the advantage of avoiding accidents due to excitability. An operator under the stress of excitement often in attempting to jam on the brakes, inadvertently steps on the accelerator. If the accelerator attachment of the present invention is used, such action on the part of the operator cannot occur. The position of the accelerator, regardless of the pressure applied, in a downward direction, remains the same.

While I have described my invention in detail in its present prefered embodiment, it will be obvious to those skilled in the art after understanding my invention, that various changes and modifications may be made therein without departing from the spirit or scope thereof. I aim in the appended claims to cover all such modifications and changes.

What I claim is:

1. The combination with a depressible accelerator pedal of an automotive vehicle, of an attachment usable in connection therewith, said attachment comprising a rigid foot-rest, a lever movable to depress the accelerator pedal, a lever movable crosswise the foot-rest to actuate said first mentioned lever, and a connection between said two levers.

2. An accelerator attachment for automotive vehicles including a foot rest rigidly supported directly above the accelerator pedal, a lever movable crosswise the foot rest, and means operable to depress the accelerator pedal thru crosswise movement of said lever.

3. An accelerator attachment for automotive vehicles including a rigidly supported foot rest mounted directly above the accelerator pedal, an operating lever movable crosswise the foot rest on the underside thereof, an upstanding portion formed on the lever at one side of the foot rest to extend thereabove, and means operable to depress the accelerator thru sidewise movement of said lever.

4. An accelerator attachment for automotive vehicles including a rigidly supported foot rest mounted adjacent to the accelerator pedal, a rigid abutment formed on the foot rest at one side thereof, an operating lever mounted on the underside of and movable crosswise the foot rest, an upstanding portion formed on said lever, said upstanding portion being extended above the foot rest on the opposite side thereof from that of said abutment, and means operable to depress the accelerator thru the movement of said lever.

5. An accelerator attachment for automotive vehicles including a rigidly supported foot rest, an operating lever mounted beneath and movable crosswise the foot rest, a cam surface movable with said lever, and means operable to depress the accelerator pedal as said cam surface is moved.

6. An accelerator attachment for automotive vehicles including a laterally movable operating lever, a second lever movable in a plane at right angles to the plane of movement of said operating lever, said last mentioned lever being movable to depress the accelerator, and a cam movable with the operating lever and engaging said second mentioned lever to transmit and convert the lateral movement of the former into a vertical movement of said second mentioned lever.

7. An accelerator attachment for automotive vehicles including an operating lever movable crosswise the accelerator pedal, a cam movable with said lever, a lever movable vertically under the action of said cam to depress the accelerator pedal, and means carried by said last mentioned lever to reduce the friction between it and said cam.

8. An accelerator attachment for automotive vehicles including an angularly adjustable rigidly supported foot rest, an operating lever movable laterally beneath the foot rest, and means operable thru movement of said lever to depress the accelerator pedal.

9. An accelerator attachment for automotive vehicles including an angularly adjustable rigidly supported foot rest, an operating lever pivoted thereto and movable laterally beneath said foot rest, and a cam surface movable with said operating lever to depress the accelerator pedal as the operating lever is laterally moved.

10. An accelerator attachment for automotive vehicles including a rigidly supported foot rest, an operating lever pivoted to the foot rest on the underside thereof, said operating lever being movable manually crosswise the foot rest and having formed thereon at one end thereof an upstanding portion, which upstanding portion is adapted to extend beyond the top face of the foot rest at one side thereof, an abutment formed upon said foot rest at the opposite side thereof, said abutment being fixed in its relation to said foot rest whereas said upstanding portion is movable with respect thereto in the operation of said lever, and means operable thru movement of said lever laterally of the foot rest to depress the accelerator pedal.

In testimony whereof I hereunto affix my signature.

JOHN G. SCHMITT.